(12) United States Patent
Saito

(10) Patent No.: US 6,985,255 B2
(45) Date of Patent: Jan. 10, 2006

(54) IMAGE COMMUNICATION APPARATUS AND ITS CONTROL METHOD

(75) Inventor: Toshiaki Saito, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 854 days.

(21) Appl. No.: 09/867,472

(22) Filed: May 31, 2001

(65) Prior Publication Data

US 2001/0038469 A1 Nov. 8, 2001

(30) Foreign Application Priority Data

Jun. 5, 2000 (JP) .............................. 2001-168127

(51) Int. Cl.
*G06K 15/00* (2006.01)
*H04N 1/46* (2006.01)

(52) U.S. Cl. ...................... 358/1.9; 358/1.16; 358/529

(58) Field of Classification Search ................ 358/400, 358/401, 1.15, 1.9, 2.1, 500, 501, 504, 530, 358/468, 518, 520, 529; 382/167
See application file for complete search history.

(56) References Cited

U.S. PATENT DOCUMENTS

| | | | |
|---|---|---|---|
| 5,134,502 A | 7/1992 | Nakatsuma | 358/440 |
| 5,666,216 A | 9/1997 | Sugiura | 358/500 |
| 5,696,598 A | 12/1997 | Yoshida | 358/434 |
| 5,726,777 A | 3/1998 | Yoshida et al. | 358/500 |
| 5,761,394 A * | 6/1998 | Sugiura et al. | 358/1.9 |
| 6,278,529 B1 * | 8/2001 | Akimoto | 358/1.9 |

FOREIGN PATENT DOCUMENTS

| | | |
|---|---|---|
| EP | 0 530 034 A1 | 3/1993 |
| EP | 0 535 818 A1 | 4/1993 |
| EP | 0 660 582 A2 | 6/1995 |
| JP | 06-006618 A | 1/1994 |
| JP | 06-022157 A | 1/1994 |
| JP | 07-203225 A | 8/1995 |
| JP | 08-046801 A | 2/1996 |
| JP | 09069953 * | 3/1997 |
| JP | 09-116777 A | 5/1997 |

OTHER PUBLICATIONS

K. Murata, et al., "Multi-Address Transmission System for Still Picture via ISDN", NTT Review, Telecommunication Association, Tokyo, JP, vol. 6, No. 2, Mar. 1, 1994, pp. 23-31.

* cited by examiner

*Primary Examiner*—Jerome Grant, II
(74) *Attorney, Agent, or Firm*—Fitzpatrick, Cella, Harper & Scinto

(57) ABSTRACT

If a color image is converted into a monochrome image and is sent when the receiver does not have color reception performance, the monochrome image is sent against user's intention. Hence, when transmission of a color image is instructed, a transmission process is controlled to send a color image, send a color image as a monochrome image, or cancel transmission, in accordance with information that pertains to color reception performance of the partner apparatus, and the setup state of a color/monochrome conversion permission switch.

12 Claims, 15 Drawing Sheets

F I G. 1
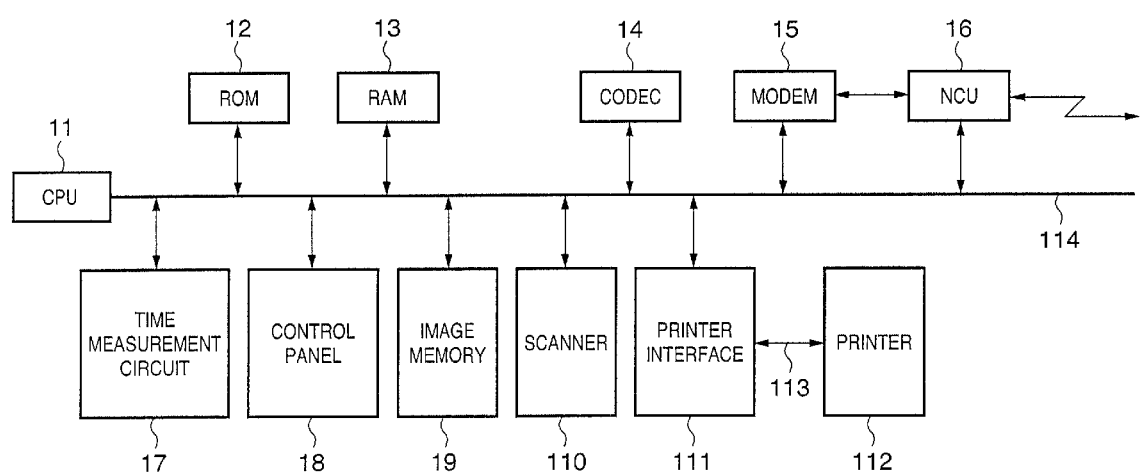

F I G. 2
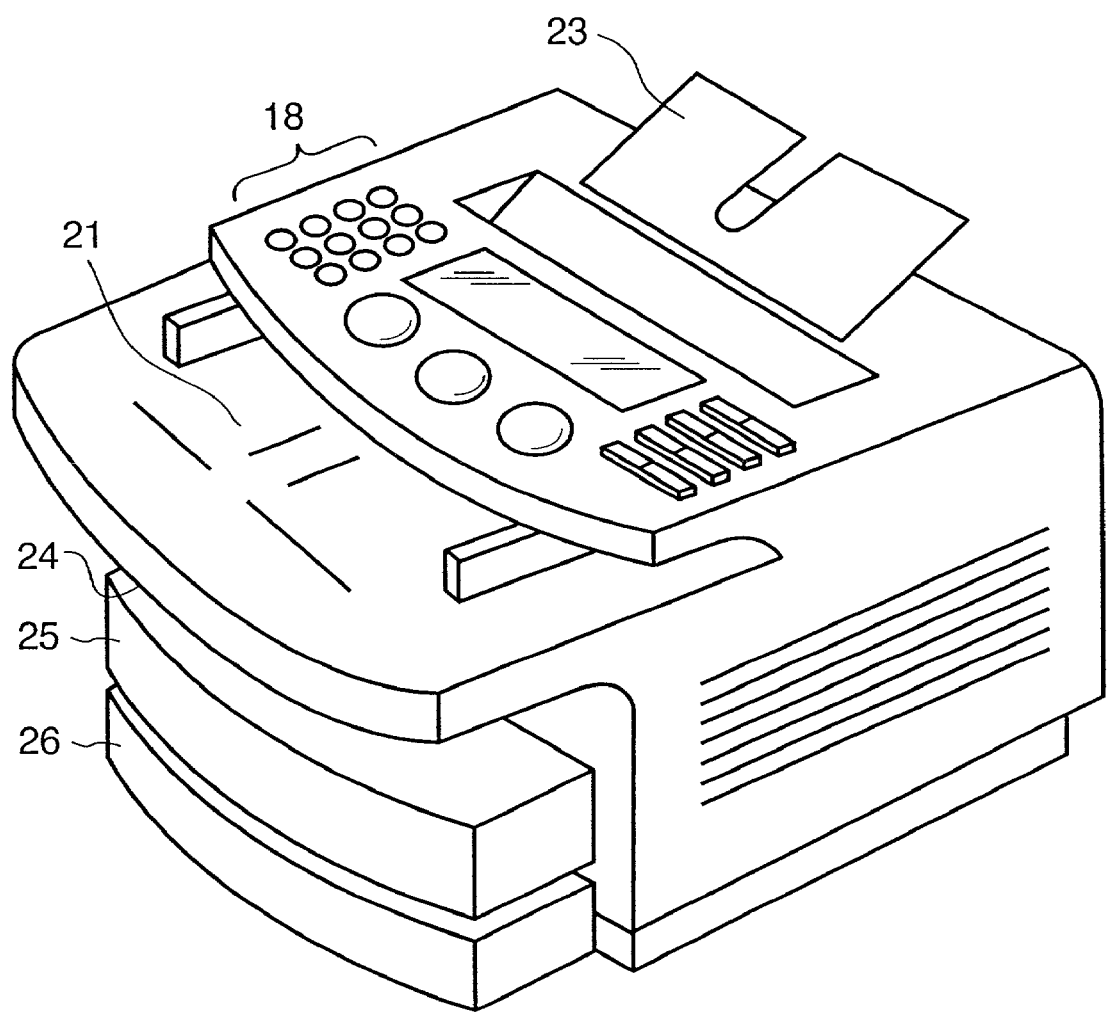

FIG. 15

1501 — TRANSMISSION RESULT REPORT

1502 — DESTINATION             NAME   XYZ BUSSAN
                               TEL    01234 - 5678

1503 — TRANSMISSION TIME       12 : 34

1504 — COMMUNICATION TIME PERIOD   00 MIN 25 SEC

1505 — TRANSMISSION RESULT     OK

1506 — NUMBER OF SENT PAGES    ( MONOCHROME )   2 PAGES
1507 — NUMBER OF SENT PAGES    ( COLOR )        3 PAGES

IMAGE COMMUNICATION APPARATUS AND ITS CONTROL METHOD

FIELD OF THE INVENTION

The present invention relates to an image communication apparatus and its control method and, more particularly, to an image communication apparatus which communicates document images including both monochrome and color images and/or color and monochrome pages, and its control method.

BACKGROUND OF THE INVENTION

As image recording and display apparatuses have higher functions, image forming apparatuses such as color copying machines, color printers, and the like have prevailed, and a color facsimile has been developed as an image communication apparatus.

The communication scheme for the color facsimile is standardized as ITU-T recommendations, and T.30, T.4, T.42, and T.81 have been recommended. Color image encoding adopts JPEG (Joint Photographic Experts Group) of the T.81 recommendation.

In the T.30 recommendation, monochrome image reception performance (to be referred to as "monochrome reception performance" hereinafter) is indispensable, but color image reception performance (to be referred to as "color reception performance" hereinafter) is optional. Even when the sender wants to send a color image, if the receiver does not have color reception performance, it cannot send a color image. Therefore, when the user makes color image transmission operation, if the receiver does not have color reception performance and the communication is interrupted, the communication cost is wasted, and the user must re-send a monochrome image. When the receiver does not have color reception performance, if a color image to be sent is converted into a monochrome image, the monochrome image is sent against user's intention.

In a memory transmission mode in which a color image is saved in a memory, and then begins to be sent, color image data compressed by JPEG is normally saved in the memory to improve the use efficiency of the memory. If the receiver to which that image is to be sent does not have color reception performance, a process for converting the image into a monochrome image must be done. That is, the saved JPEG image data is expanded to, e.g., multi-valued RGB data, which is binarized by error diffusion or dithering. Furthermore, the binary image is compressed by an encoding scheme such as MH (Modified Huffman), MR (Modified READ), MMR (Modified Modified READ), JBIG (Joint Binary Image Group), or the like in accordance with the reception performance of the receiver. These processes require a speed corresponding to the communication rate, resulting in high cost since hardware components must be added and performance must be improved.

Upon sending a facsimile document, e.g., upon sending a document which includes both color and monochrome image pages (to be referred to as a color/monochrome mixed document" hereinafter) (e.g., a monochrome image is sent as the first page, and a color image is sent as the second page), the first monochrome image page can be sent irrespective of the presence/absence of color reception performance of the receiver, but the second color image page cannot be sent if the receiver has no color reception function. As a result, the receiver receives the first page alone, and both parties may be confused.

SUMMARY OF THE INVENTION

The present invention has been made to individually or simultaneously solve the aforementioned problems, and has as its object to send images as the user intended.

In order to achieve the above object, a preferred embodiment of the present invention discloses a communication apparatus including an image processor, arranged to process color and monochrome images; and a communication controller, arranged to control a communication with a partner apparatus. The apparatus also includes a setter, arranged to set whether a color image is transmitted as a monochrome image or not when the partner apparatus does not have color reception performance, and a mode controller, arranged to control a switch between a memory transmission mode which starts transmission of an image after the image is stored in a memory, and a direct transmission mode which generates an image to be transmitted after the communication with the partner apparatus is started. When transmission of a color image is instructed, the mode controller selects the memory transmission mode if the transmission of the color image as a monochrome image is inhibited by the setter, or the direct transmission mode if that is permitted by the setter.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram showing the arrangement of an image communication apparatus according to an embodiment of the present invention;

FIG. 2 is a perspective view showing the outer appearance of the image communication apparatus;

FIG. 15 shows an example of the transmission result report.

DESCRIPTION OF THE PREFERRED EMBODIMENTS

Figure 3:
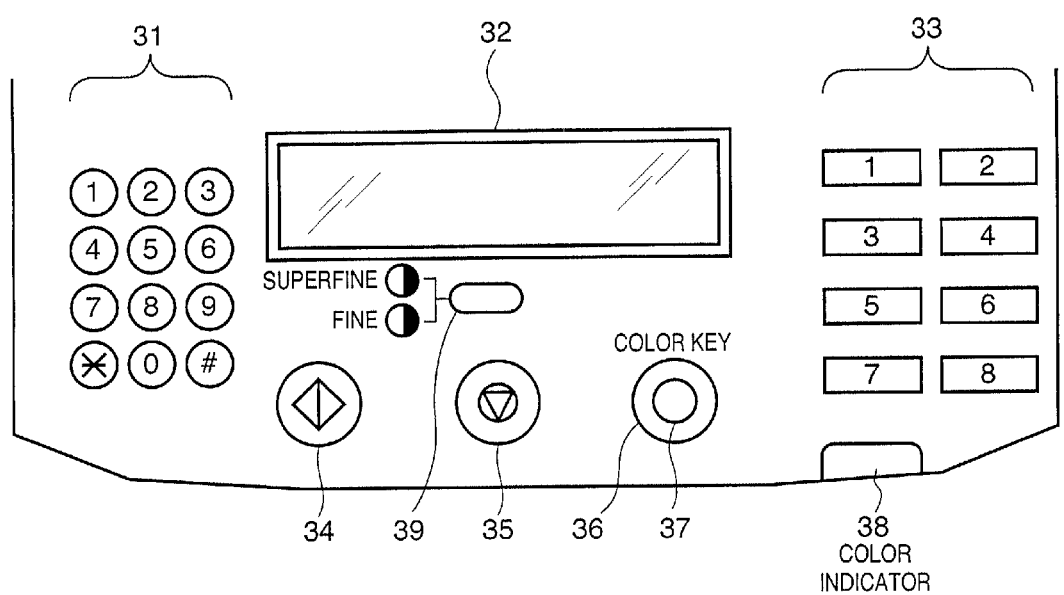
FIG. 3 is a plan view showing the outer appearance of a control panel.

An image communication apparatus according to an embodiment of the present invention will be described in detail hereinafter with reference to the accompanying drawings. The image communication apparatus to be described below is a facsimile apparatus which has a G3 facsimile function and is connected to an analog telephone line when it is used, and a color image transmission/reception function is added.

[Arrangement of Image Communication Apparatus]

FIG. 1 is a block diagram showing the arrangement of an image communication apparatus according to an embodiment of the present invention.

Referring to FIG. 1, a CPU 11 controls the overall apparatus of this embodiment via a system bus 114. A ROM 12 stores programs for implementing various kinds of control. A RAM 13 is a nonvolatile memory which is used as a work area of the CPU 11, and is backed up by a battery.

A CODEC 14 executes color space conversion, raster→block conversion, and JPEG encoding functions upon sending a color image, executes JPEG decoding, inverse color space conversion, and block→raster conversion functions upon receiving a color image, and executes encoding or decoding such as MH, MR, MMR, JBIG, or the like upon transmitting/receiving a monochrome image. That is, the CODEC 14 converts R, G, and B color component signals (e.g., 8 bits per pixel) into L*, a*, and b* uniform perceptual space signals, encodes them by JPEG baseline coding, and outputs the encoded signals. Conversely, upon receiving codes encoded by JPEG baseline coding, the CODEC 14 converts L*, a*, and b* uniform perceptual space signals obtained by decoding them into C, M, Y, and K color component signals, and outputs those signals.

A MODEM 15 complies with the ITU-T recommendations V.8, V.34, V.17, V.29, and V.27ter, and modulates/demodulates signals to be sent/received. An NCU (Network Control Unit) 16 makes connection control and the like with a telephone network, and a time measurement circuit 17 comprises a timepiece LSI or the like having a calendar function.

A control panel 18 has various operation keys and an LCD display, and an image memory 19 which comprises a semiconductor memory is controlled to save image data in units of pages.

A color scanner 110 optically reads a document image, separates the read image into R, G, and B components, and outputs multi-valued data (8 bits per color) as pixel data. In this embodiment, a color contact sensor is used as a read device, and an ADF (Automatic Document Feed) function of automatically feeding a document from which an image is to be read is equipped.

A printer interface 111 has a quantization processor and interface controller, and connects and controls a printer 112 via a versatile interface 113 such as IEEE1248 or the like. Upon receiving C, M, Y, and K color multi-valued signals, the printer interface 111 quantizes these color multi-valued signals to binary or ternary signals by error diffusion or dithering, and sends them to the printer 112. The printer interface 111 also has a function of informing the CPU 11 of the status of the printer 112 via the interface.

The printer 112 prints a color image by an ink-jet print scheme. Ink cartridges that can be mounted on the printer 112 include those for monochrome print, color print, high-resolution color print, and the like, and the type of cartridge mounted is recognized by the printer interface 111.

[Outer Appearance of Apparatus]

FIG. 2 is a perspective view showing the outer appearance of the image communication apparatus of this embodiment, and FIG. 3 is a plan view showing the outer appearance of the control panel 18.

As shown in FIG. 2, a document table 21 used to set documents is provided on the upper surface of the apparatus housing. The document table 21 has a document guide for preventing a document from skewing upon feeding. The control panel 18 is provided on the upper side of the document table 21. A document exhaust tray 23 is provided behind the control panel 18.

A print sheet exhaust unit 24 is provided to the front surface of the apparatus housing, and print sheet cassettes 25 and 26 in which print sheets are set are inserted below the unit 24. For example, A4-size print sheets can be set in the print sheet cassette 25, postcard-size print sheets can be set in the print sheet cassette 26, and the size and type of print sheets set in each print sheet cassette can be recognized by a given mechanism.

The control panel 18 shown in FIG. 3 has a ten-key unit 31 which includes 12 different keys "0" to "9", "#", and "*", and is mainly used to input a telephone number, and an LCD display 32 which displays the status of the apparatus, and makes display for confirming the input telephone number. The control panel 18 also has one-touch keys 33 used to read out a telephone number or the like pre-stored in the RAM 13, and to send data by one touch, and a stop key 35 used to stop the operation which is underway.

A color key of the control panel 18 is used to instruct a color document process, and lamps are respectively attached to an outer frame portion 36 and inner portion 37 of this key. The lamp (color document LED) of the outer frame portion 36 is turned on when the user presses the color key upon making transmission operation, and makes the user recognize a mode in which images including a color page can be sent. The lamp (color page LED) of the inner portion 37 is turned on/off in response to operation of the color key upon reading a page. When a document is read while this lamp is ON, it is read as a color page; when a document is read while the lamp is OFF, it is read as a monochrome page. That is, the user can input a transmission instruction of a color/monochrome mixed document by operating the color key.

A color indicator 38 indicates whether or not the printer 112 can print a color image, and is turned on while it is detected that the printer 112 can record a color image. A resolution select key 39 is used to switch the read resolution upon reading a document, and its state changes every time the resolution select key 39 is pressed. That is, the user can adjust the roughness of an image to be sent by the resolution select key 39.

[Flow of Image Data]

Figure 4:
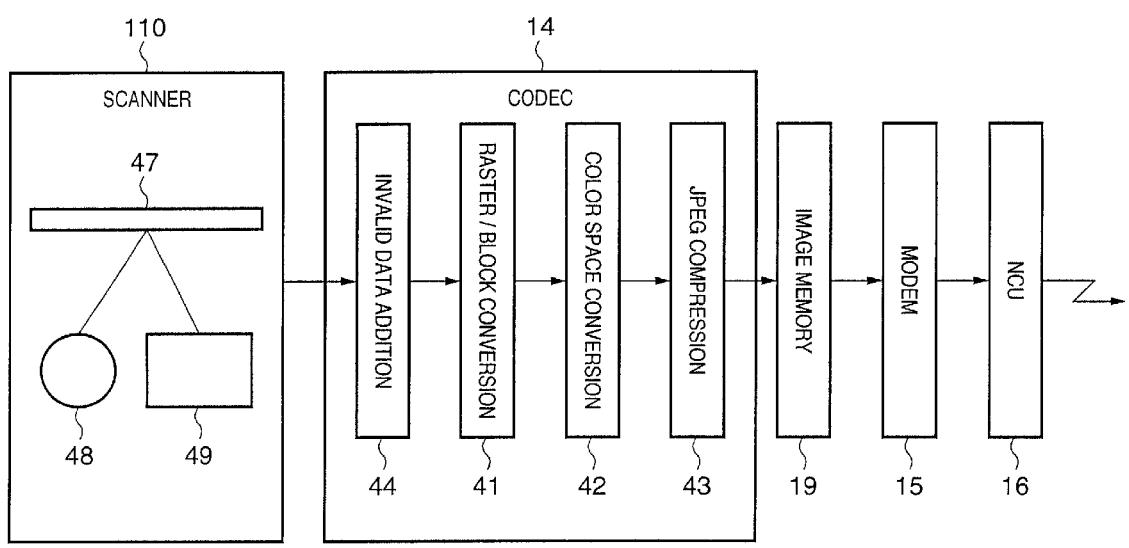
FIG. 4 is a block diagram for explaining the flow of transmission image data.
Figure 5:
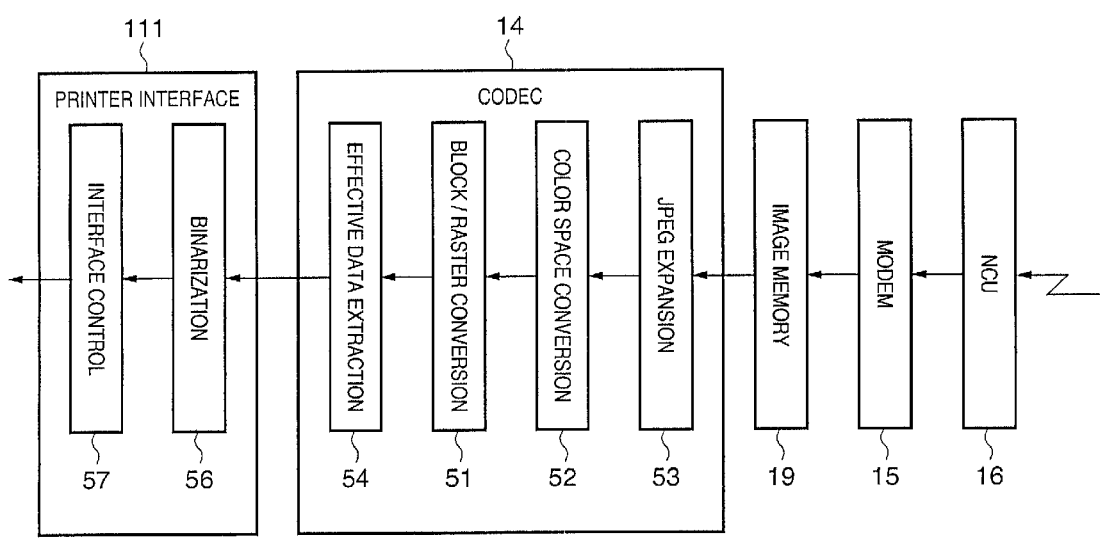
FIG. 5 is a block diagram for explaining the flow of reception image data.

FIG. 4 is a block diagram for explaining the flow of transmission image data, and FIG. 5 is a block diagram for explaining the flow of reception image data.

Upon sending a color image, the scanner 110 reads an image on a document 47 illuminated by a light source 48 using a color contact sensor 49, separates the read image into three colors R, G, and B, converts them into 8-bit digital data per color, and outputs the converted data onto the system bus 114.

The color image data are input to the CODEC 14 via the system bus 114, are temporarily stored in an internal buffer memory of the CODEC 14, and undergo an invalid data addition process 44. That is, all white data are appended as invalid data to an image portion that exceeds an effective size to obtain a main scan size of a page specified by the ITU-T recommendation. Then, a raster/block conversion process 41 breaks up raster image data into blocks of 8×8 pixels. More specifically, 8-bit raster data sent in the order of R, G, and B are converted into data in the order of an 8×8 pixel block for an R color component (R block), 8×8 pixel block for a G color component (G block), 8×8 pixel block for a B color component (B block), R block, G block, . . . by rearranging them into 8×8 pixel blocks for respective color components.

The R, G, and B data converted into the block order undergo a known color space conversion arithmetic operation by a color space conversion process 42, and are converted from an RGB color space into block order data in an L*a*b* color space. Subsequently, the obtained data sequence undergoes a JPEG compression process 43, thus outputting JPEG data from the CODEC 14. The JPEG data output from the CODEC 14 is temporarily stored in the image memory 19, and is modulated to an audio signal by the MODEM 15, which signal is output onto the analog line via the NCU 16.

Upon receiving an image, image data which is received from the analog line via the NCU 16 and demodulated by the MODEM 15 is temporarily stored in the image memory 19. The CODEC 14 reads out the image data from the image memory 19, and baseline-decodes the image data to obtain block order data in the L*a*b* color space by a JPEG expansion process 53 when it is a color image. The block order data in the L*a*b* color space are converted into those in a CMY color space by a color space conversion process 52, and are then converted into a data sequence of C, M, and Y color components in a raster order, i.e., C, M, and Y data by a block/raster conversion process 51. The C, M, and Y data are temporarily stored in the internal buffer memory of the CODEC 14, and an effective data extraction process 54 extracts an effective image data region and sends it to the printer interface 111.

The printer interface 111 extracts a black component from the input C, M, and Y data to generate C, M, Y, and K data, and executes masking and gamma correction of the C, M, Y, and K data in correspondence with the color reproduction characteristics of the printer 112. After that, the printer interface 111 binarizes (or quantizes) the processed data of the respective colors, and sends them to the printer 112.

[Outline of Communication Sequence]

Figure 6:
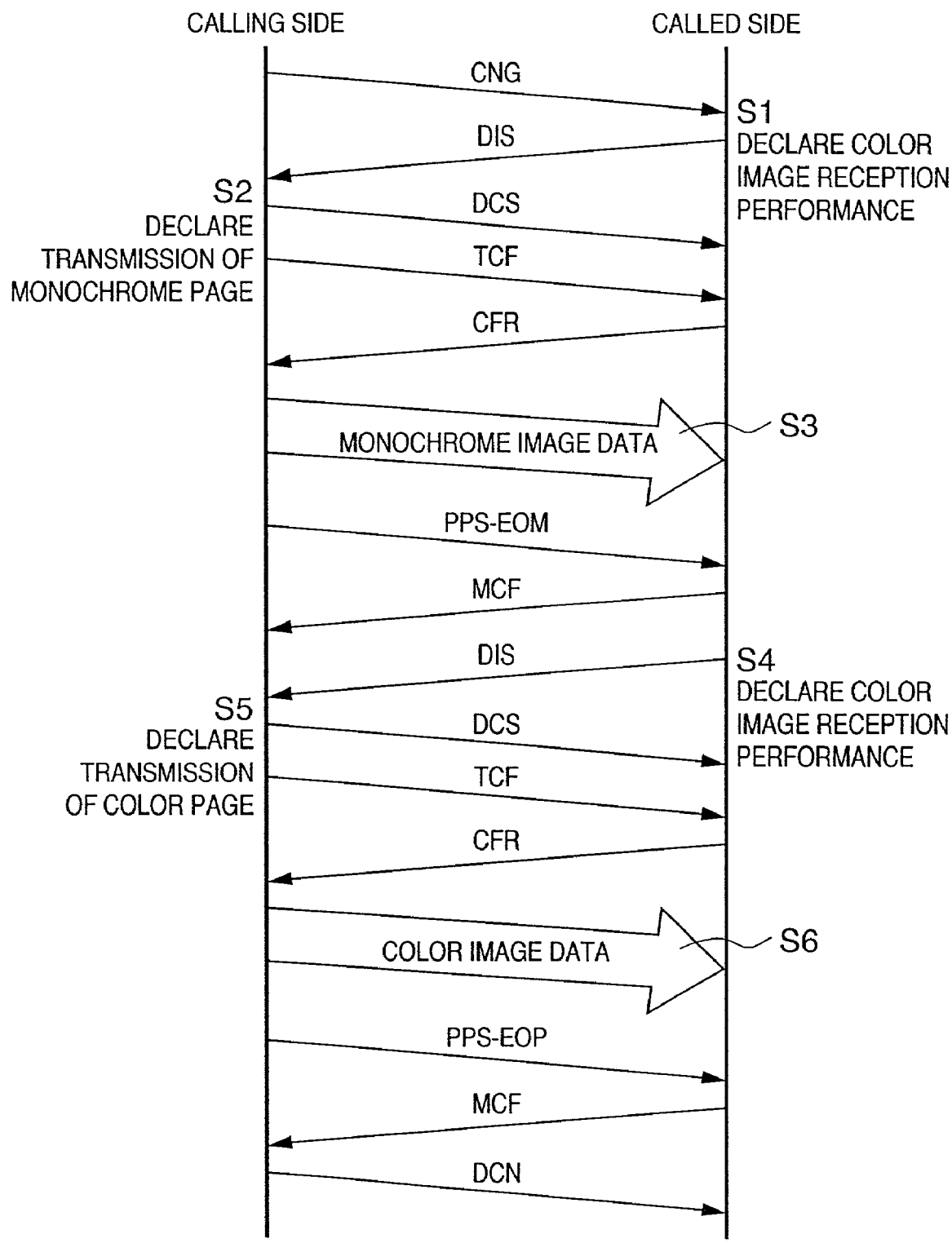
FIG. 6 is a chart showing the communication sequence of a color image communication.

FIG. 6 shows the communication sequence of a color image communication, i.e., the basic flow according to the ITU-T recommendation T.30. FIG. 6 exemplifies a case wherein a monochrome image is sent as the first page, and a color image is sent as the second page.

In phase B, if color reception performance is available, the called side (receiving side) declares color reception performance as performance of the self apparatus using a DIS (Digital Identification Signal) (S1 and S4). The calling side (sending side) confirms the performance of the receiving side by the DIS, and declares transmission of a monochrome image (S2) using a DCS (Digital Command Signal) upon sending a monochrome image. If the receiving side has color reception performance, the sending side declares transmission of a color image using the DCS (S5). In phase C, the sending side sends a monochrome image encoded by MH, MR, MMR, or JBIG corresponding to the reception performance of the receiving side (S3) or a color image compression-encoded by JPEG baseline coding (S6) while breaking up the image into ECM (Error Correction Mode) blocks.

[Structure of Image Data]

Figure 7:
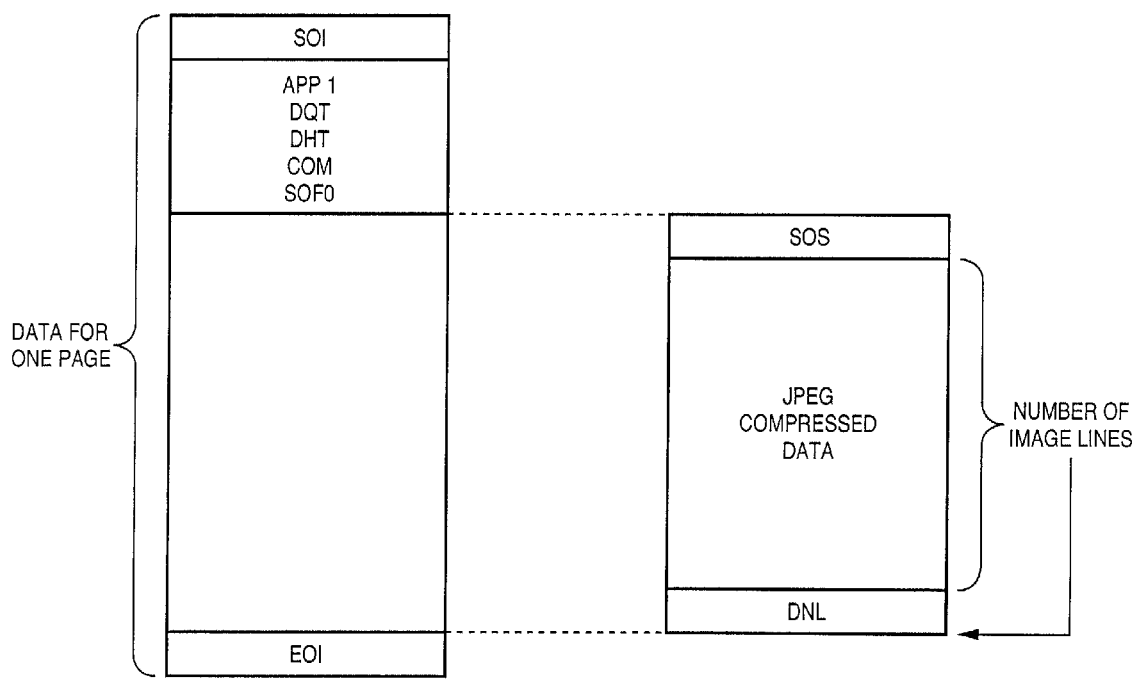
FIG. 7 shows the data structure of JPEG baseline encoded data in the color image communication specified by ITU-T recommendations T.4 and T.81.

FIG. 7 shows the data structure of JPEG baseline encoded data in a color image communication specified by the ITU-T recommendations T.4 and T.81.

Data for one page is comprised of an image frame sandwiched between SOI (Start of Image) and EOI (End of Image) markers. The image frame is divided into a so-called JPEG header which follows SOI and includes AAP1 (APPlication marker 1), DQT (Define Quantization Table), DHT (Define Huffman Table), COM (COMment marker), SOF0 (Start of Frame 0) markers, and the like, and JPEG compressed data starting from an SOS (Start of Scan) marker.

In the color image communication sequence based on the recommendations T.30 and T4, the use method of the APP1 marker is specified for G3 FAX. The DQT marker defines a quantization table in JPEG compression, which changes the compression ratio and quality of an image. The DHT marker defines a Huffman table. The COM marker is a marker in which a comment can be written, and is specified to be ignored upon decoding in the recommendation T.4. The SOF0 marker specifies various parameters in baseline JPEG compression, which include the numbers of main scan and sub-scan pixels of image data.

In terms of the arrangement of the facsimile, if the number of sub-scan pixels is indefinite upon JPEG compression of image data, "0" is set in the number of sub-scan pixels on the SOF0 marker, and the number of sub-scan pixels of compressed image data can be re-set by a DNL (Define Number of Lines) marker after the compressed data that starts with the SOS marker.

[Details of Communication Sequence]

Figure 8:
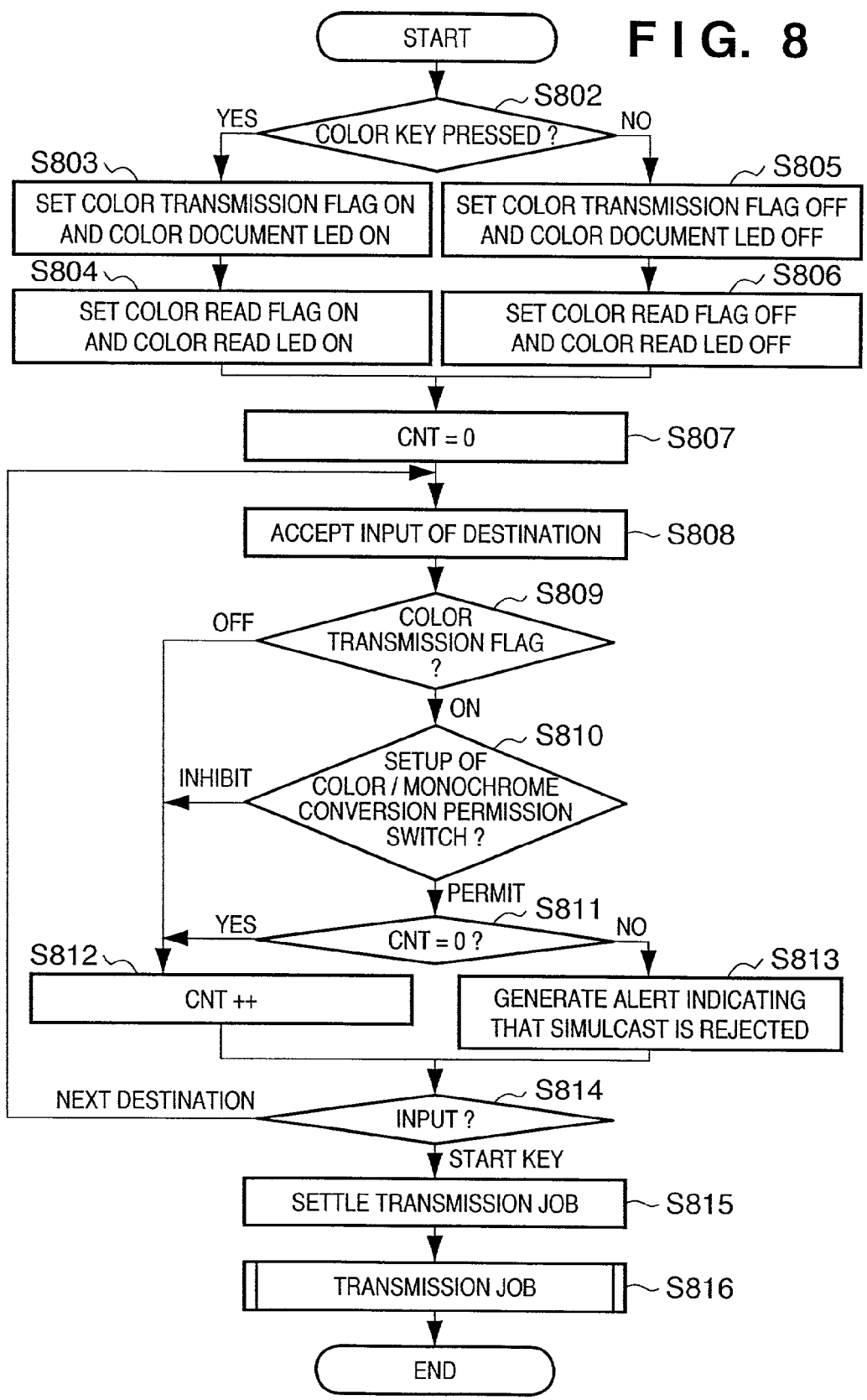
FIG. 8 is a flow chart showing the processing sequence in transmission operation.

The image transmission sequence in this embodiment will be described in detail below. FIG. 8 is a flow chart showing the processing sequence in transmission operation, which is executed by the CPU 11.

Upon sending an image, the user presses the color key to select whether or not a color image (including a color/monochrome mixed document) is to be sent. The CPU 11 checks if the color key has been pressed (S802). If YES in step S802, the CPU 11 sets a color transmission flag indicating transmission of a color image ON, and the color document LED of the outer frame portion 36 of the color key ON (S803). Also, the CPU 11 sets a color read flag for reading a color image ON, and the color page LED of the inner portion 37 of the color key ON (S804).

On the other hand, if the color key has not been pressed, the CPU 11 sets the color transmission flag OFF, and the color document LED OFF (S805). Also, the CPU 11 sets the color read flag OFF, and the color page LED OFF (S806).

The CPU 11 initializes to prepare for input of a destination, and resets a counter CNT for counting the number of transmissions to zero (S807). Subsequently, the CPU 11 accepts user's input or designation of a destination (S809). Note that the destination is input using the ten-key unit 31 or one-touch keys 33.

If one destination is input, the status of the color transmission flag is checked (S809). If the flag is OFF, it is determined that a monochrome image is to be sent, and the flow jumps to step S812. On the other hand, if the flag is ON, the setup of a color/monochrome conversion permission switch as one of software switches that the user can pre-set is checked (S810). That is, it is checked based on the setup of the color/monochrome conversion permission switch if transmission of a color image is to be canceled when the receiving apparatus does not have color reception performance. If the color/monochrome conversion permission switch is set to permit (i.e., a color image is converted into a monochrome image, and the monochrome image is sent without canceling transmission), the flow advances to step S811. On the other hand, if the color/monochrome conversion permission switch is set to inhibit (i.e., transmission of a color image is canceled), the flow advances to step S812.

In step S811, the number of destinations is checked based on the count value of the counter CNT. That is, if the value of the counter CNT is zero, it is determined that only the first destination is input, and the counter CNT is incremented (S812), thus permitting the destination input in step S808. On the other hand, if the counter CNT is not zero, it is determined that a plurality of destinations are input (simulcast), and the CPU informs the user of rejection of the destination input in step S808, i.e., rejection of simulcast by means of alert sound or message (S813).

A user's input is checked in step S814, and if the next destination is input, the flow returns to step S808. On the other hand, if the user has pressed the start key 34, a transmission job is settled (S814), and is launched (S815).

Figure 9:
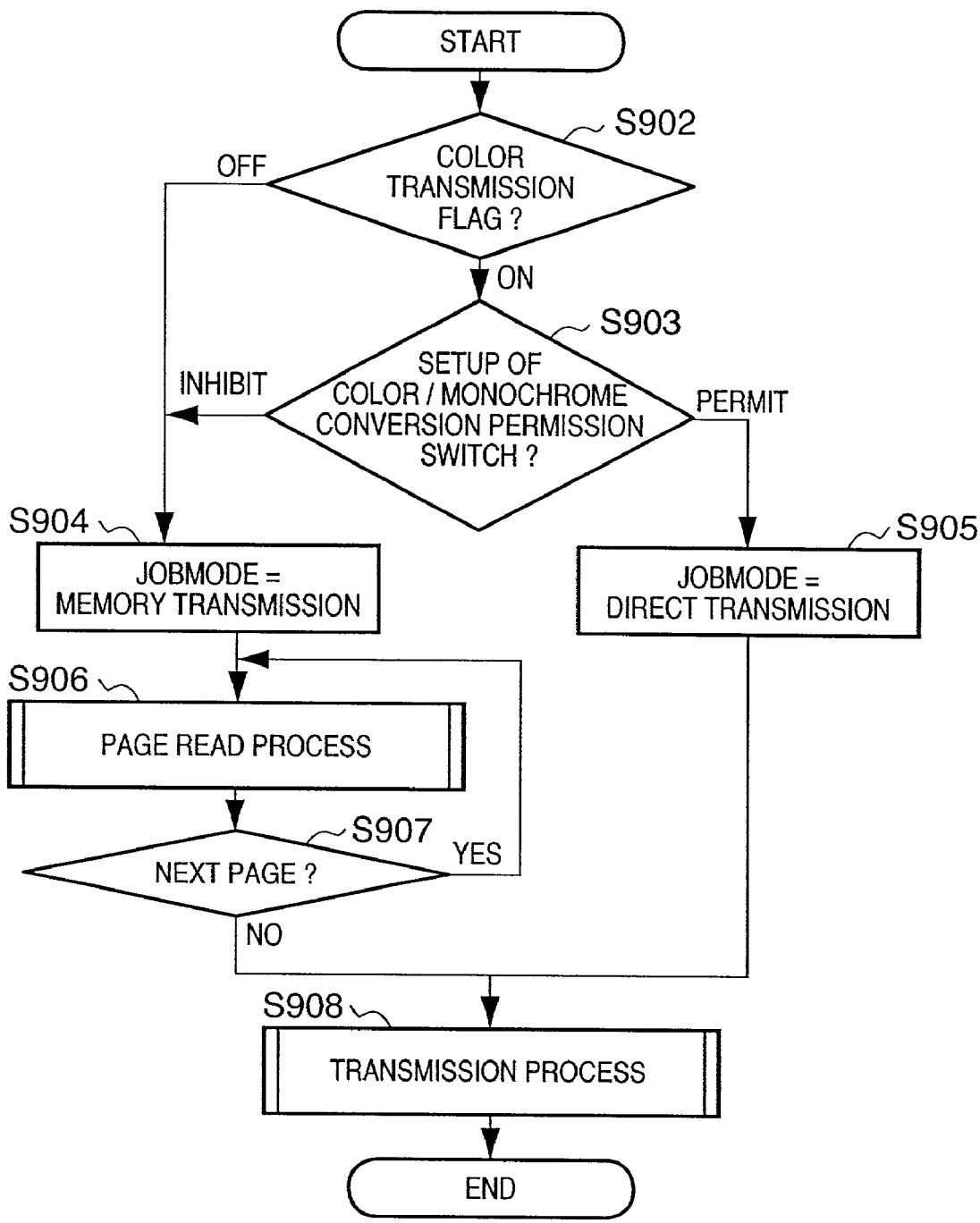
FIG. 9 is a flow chart showing the operation after a transmission job is launched until a transmission process starts.

FIG. 9 is a flow chart showing the operations after the transmission job is launched until a transmission process starts, which is executed by the CPU 11.

The status of the color transmission flag is checked (S902). If the flag is OFF, it is determined that a monochrome image is to be sent, and the flow jumps to step S904. If the flag is ON, it is determined that a color image is to be sent, and the setup of the color/monochrome conversion permission switch is checked (S903). If the color/monochrome conversion permission switch is set to permit (i.e., a color image is converted into a monochrome image, and the monochrome image is sent without canceling transmission), a job mode flag JOBMODE is set to "direct transmission" (S905), and the flow advances to step S908.

On the other hand, if the color/monochrome conversion permission switch is set to inhibit (i.e., transmission of a color image is canceled), the job mode flag JOBMODE is set to "memory transmission" S904), and a page read process (to be described later) is done so as to execute memory transmission that starts transmission after a document image is read (S906). After an image for one page is read, the presence/absence of the next page is checked (S907). If the next page remains, the page read process in step S906 is repeated. After the final page of the document is read, the flow advances to step S908 to launch a transmission process.

Figure 10:
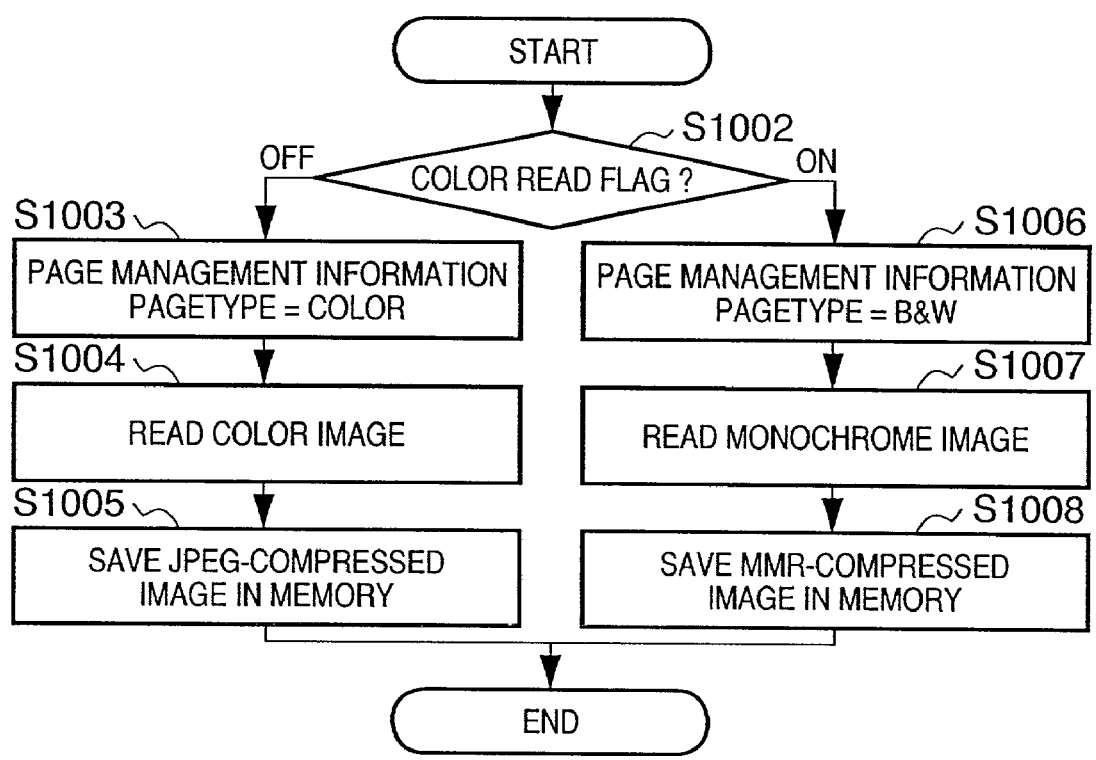
FIG. 10 is a flow chart showing a page read process.

FIG. 10 is a flow chart showing the page read process, which is executed by the CPU 11.

The status of the color read flag is checked (S1002). If the flag is ON, a page management information flag PAGETYPE, which is used to manage read page information, is set to "color" so as to process an image to be sent as a color image (S1003), a document image is read in a color mode (S1004), and color image data compressed by JPEG is saved in the image memory (S1005).

On the other hand, if the color read flag is OFF, the page management information flag PAGETYPE, which is used to manage read page information, is set to "B&W" so as to process an image to be sent as a monochrome image (S1006), a document image is read in a monochrome mode (S1007), and monochrome image data compressed by MMR is saved in the image memory (1008).

Figure 11:
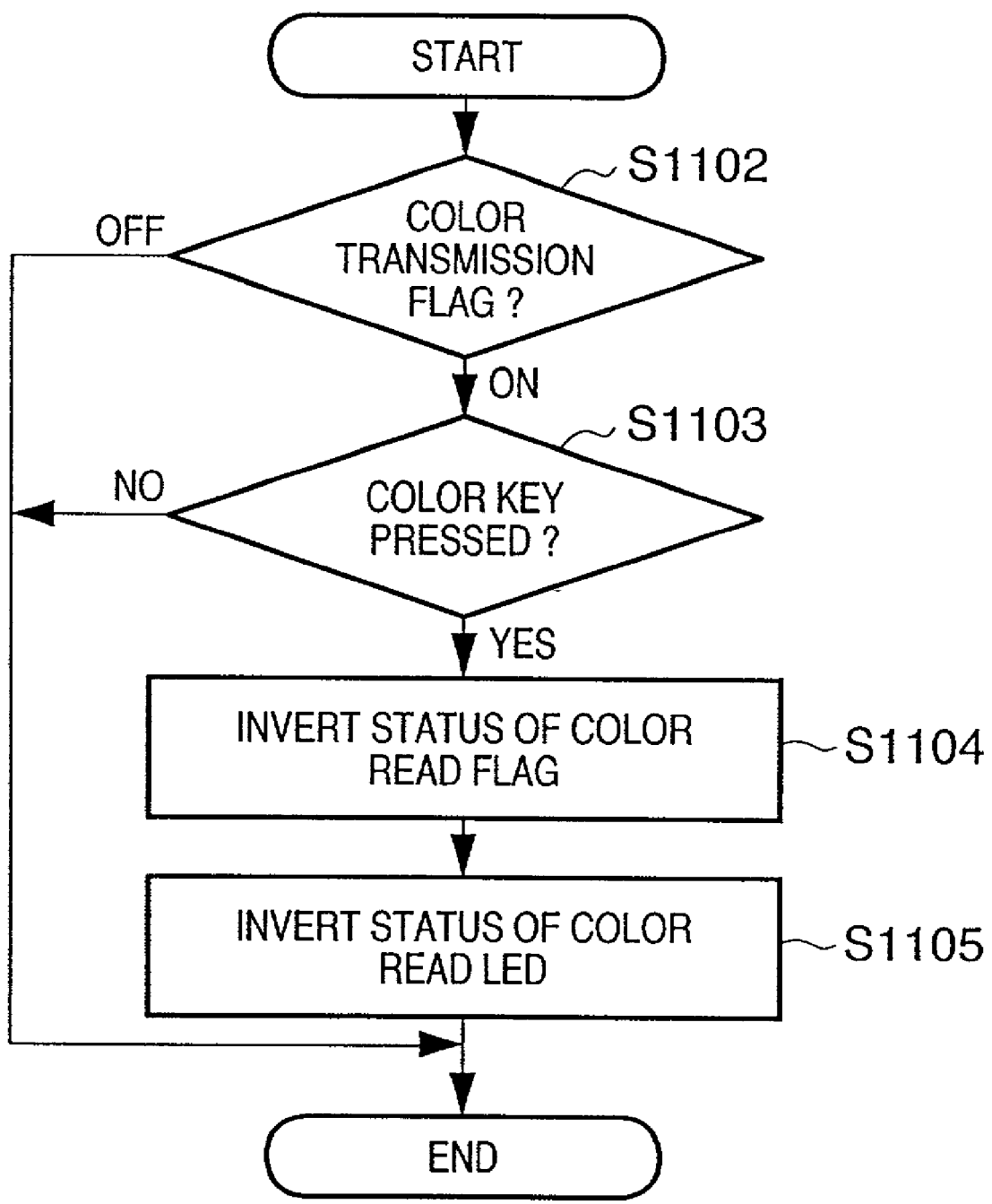
FIG. 11 is a flow chart showing a process executed at a predetermined timing in the page read process after a transmission job is settled.

FIG. 11 is a flow chart showing the process executed at a predetermined timing in the page read process after the transmission job is settled, which is executed by the CPU 11. That is, in this process, when the user presses the color key during an interval after the transmission job is settled until the first document page begins to be read, and an interval between the read processes of two pages, the color read flag is inverted to change the document image read mode.

The status of the color transmission flag is checked (S1102). If the flag is OFF, the processing ends without any process. On the other hand, if the flag is ON, it is checked if the color key has been pressed (S1103). If the key has not been pressed, the processing ends. On the other hand, if the color key has been pressed, the status of the color read flag is inverted (S1104), and the status of the color read LED is inverted (S1105).

Figure 12:
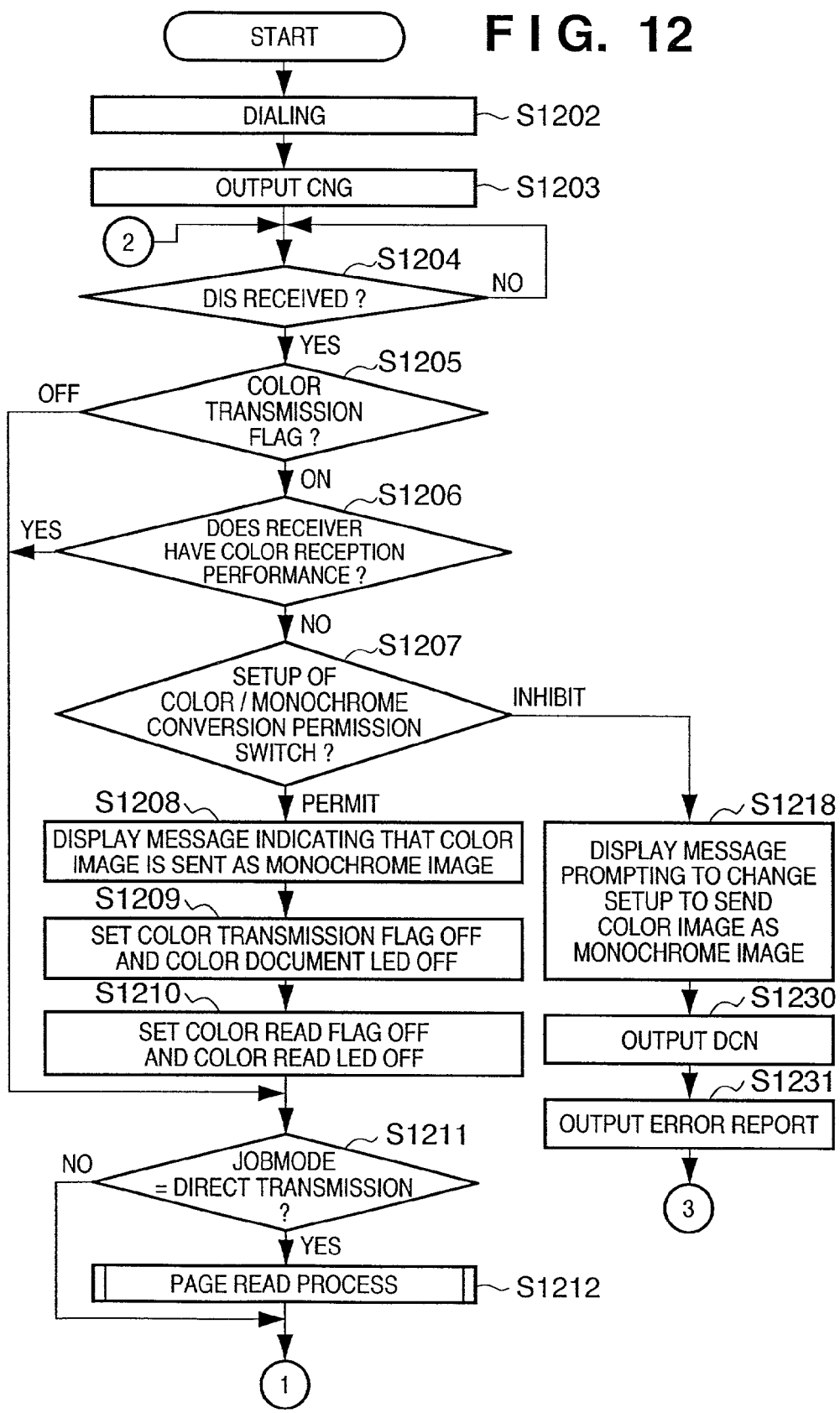
FIGS. 12 and 13 are flow charts showing a transmission process.
Figure 13:
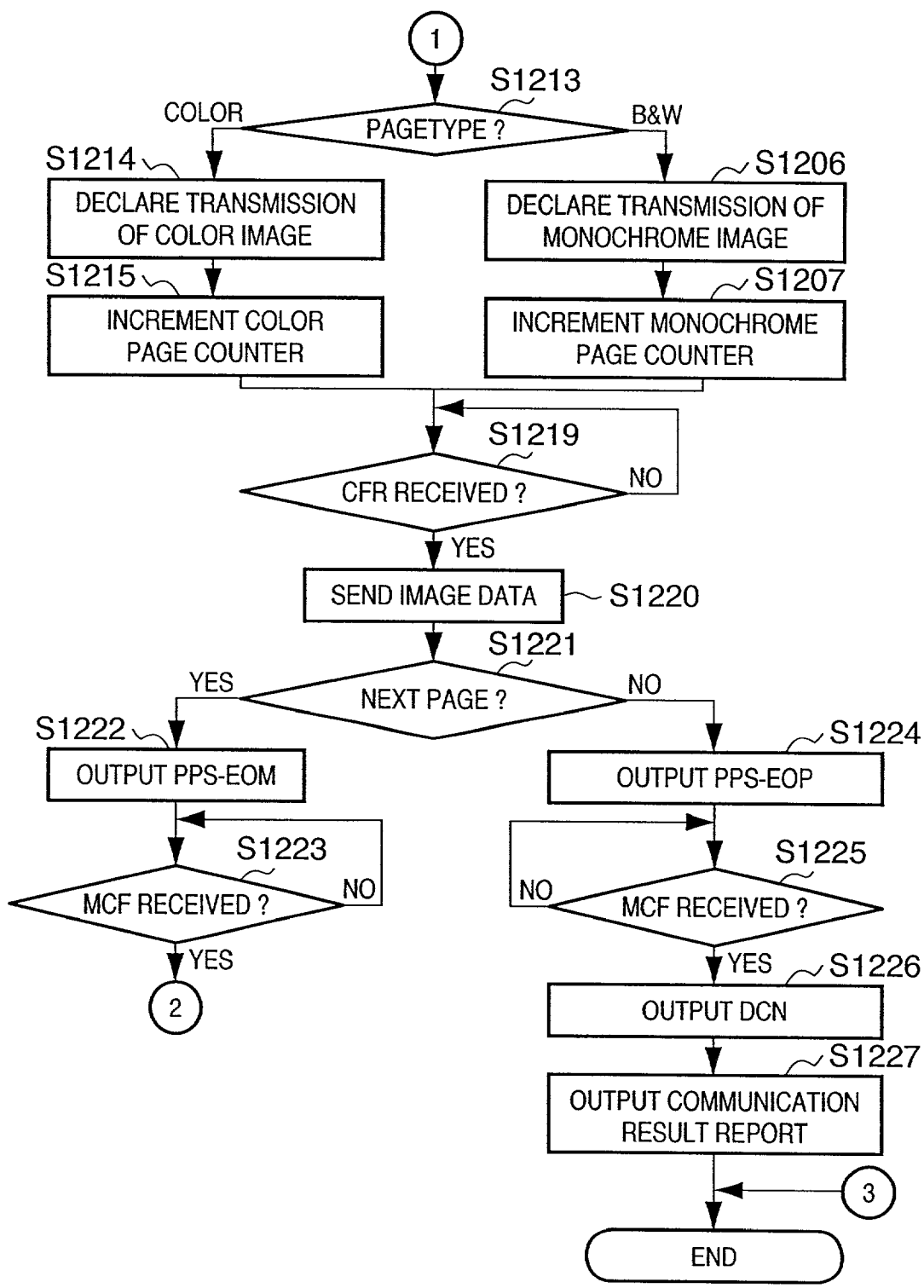

FIGS. 12 and 13 are flow charts showing the transmission process, which is executed by the CPU 11.

Dialing is made to call the destination registered in the transmission job (S1202), and a calling signal CNG is sent (S1203). Upon receiving a DIS from the receiver (S1204), the status of the color transmission flag is checked (S1205). If the flag is OFF, since a monochrome document is to be sent, the flow jumps to step S1211.

If the color transmission flag is ON, the received DIS is analyzed to check if the receiver has color reception performance (S1206). If the color reception performance is available, the flow jumps to step S1211.

On the other hand, if the color transmission flag is ON and the receiver does not have color reception performance, the status of the color/monochrome conversion permission switch is checked (S1207). If the switch is set to permit, a message "send color image as monochrome image" or the like is displayed on the LCD 32 on the control panel 18, the color transmission flag and color document LED are set OFF (S1209), the color read flag and color read LED are set OFF (S1210), and the flow jumps to step S1211. That is, the document image is inhibited from being read in the color mode but is read in the monochrome mode.

If the color transmission flag is ON, the receiver does not have color reception performance, and the color/monochrome conversion permission switch is set to inhibit, a message "change setup to send color image as monochrome image" or the like is displayed on the LCD 32 (S1218), a line disconnect command DCN (Disconnect) for canceling a communication is output (S1230), and a transmission error report is output (S1231), thus ending the transmission process.

In step S1211, the status of the job mode flag JOBMODE is checked. If the direct transmission mode is set, the page read process shown in FIG. 10 is executed (S1212). If the color transmission flag is ON, the receiver does not have color reception performance, and the color/monochrome conversion permission switch is set to permit, all document images as well as color document images are read as monochrome images.

In step S1213, the status of the page management information flag PAGETYPE is checked. If the flag PAGETYPE="color", a DCS that declares transmission of a color image is output (S1214), and a color page counter that counts the number of sent color pages is incremented (S1215). On the other hand, if the flag PAGETYPE="B&W", a DCS that declares transmission of a monochrome image is output (S1216), and a monochrome page counter that counts the number of sent monochrome pages is incremented (S1217).

The control waits for a reply using CFR (Confirmation to Receive) which is sent back from the receiver in response to the DCS (S1219). Upon receiving the CFR, compressed image data corresponding to a monochrome or color page is read out from the image memory 19 and is sent (S1220). Upon completion of transmission of the page, the presence/absence of the next page is checked (S1221). If the next page is present, PPS-EOM (Partial Page Signal-End of Message) is output (S1222), and the control waits for a message confirmation signal MCF (Message Confirmation) (S1223). Upon receiving the MCF, the flow returns to step S1204 to execute phase B of the recommendation T.30 again.

If no next page is present, PPS-EOP (Partial Page Signal-End of Procedure) is output (S1224). Upon receiving the MCF (S1225), the line is disconnected by outputting a DCN so as to end the communication (S1226), and a transmission result report is output (S1227), thus ending the transmission process.

Figure 14:
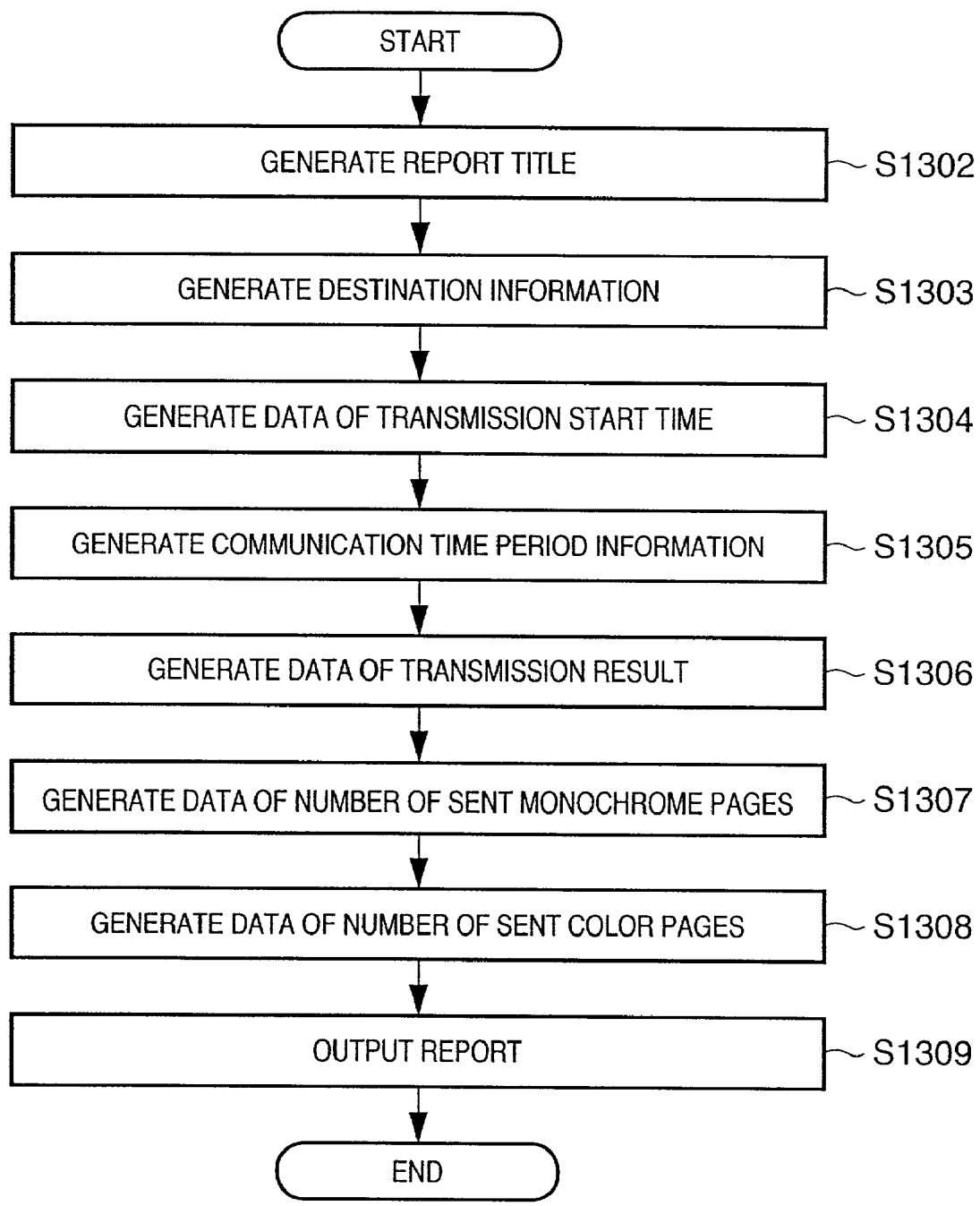
FIG. 14 is a flow chart showing a process for outputting a transmission result report.

FIG. 14 is a flow chart showing the process for outputting the transmission result report, which is executed by the CPU 11. FIG. 15 shows an example of the transmission result report.

Data of a report title 1501 is generated (S1302), data of a destination's telephone number/abbreviation 1502 is generated (S1303), data of transmission start time 1503 is generated (S1304), data of a communication time period 1504 is generated (S1305), data of a communication result 1505 is generated (S1306), data of the number of sent monochrome pages is generated based on the count value of the monochrome page counter (S1307), and data of the number of sent color pages is generated based on the count value of the color page counter (S1308). Based on the generated data, a report shown in FIG. 15 is printed out (S1309).

In this way, the image communication apparatus of this embodiment comprises the color/monochrome conversion permission switch with which the user instructs if transmission is canceled or a monochrome image obtained by converting a color image is sent, when it is checked if the receiver has color reception performance and it is determined that the receiver does not have color reception performance. Hence, the user can pre-set actions to be taken when the receiver does not have color reception performance.

When the direct transmission mode is set, the document image read process can start after the performance of the receiver is checked. Therefore, when the receiver does not have color reception performance, the need for a process for expanding compressed color image data which has been read and saved in the memory, binarizing the expanded data to a monochrome image, and compressing the monochrome image again can be obviated, and an increase in cost due to addition of hardware for implementing processing performance corresponding to the communication rate and improvement in performance can be suppressed.

When a document image is read by a sheet-through scheme, it is difficult to read an image again from a document from which the image has already been read once. In other words, only one destination can be designated in the direct transmission mode. Of course, simulcast of a monochrome image can be made using the memory transmission mode, and a plurality of destinations can be designated.

On the other hand, when transmission of a color image is controlled in accordance with the presence/absence of color reception performance of the receiver, if it is difficult to read an image again, simulcast cannot be implemented unless a process for converting a color image into a monochrome image is done. Hence, to avoid the process for converting a color image into a monochrome image, one destination can only be designated when transmission of a color image is instructed. When transmission of a color image is instructed, and the second destination is input, an alert that rejects simulcast (e.g., by displaying an alert message or generating alarm sound) is output, thus informing the user that it is impossible to input a plurality of destinations (impossible to execute simulcast).

The user can designate for each document page if that page is sent as a color or monochrome image, and it can be checked if pages to be sent include a color page. Therefore, upon sending a color/monochrome mixed document, the presence/absence of color reception performance of the receiver is checked at the beginning of a communication, and if no color reception performance is available, the communication can be immediately canceled or a monochrome image obtained by converting a color image can be sent in accordance with the setup of the color/monochrome conversion permission switch. That is, sending of the first page (monochrome image) alone of the color/monochrome mixed document to the receiver and confusion on both the parties can be prevented.

Upon sending the color/monochrome mixed document, a monochrome image obtained by converting a color image may be sent in accordance with the color reception performance of the receiver, and the setup of the color/monochrome conversion permission switch. In such case, in order to inform the user that the monochrome image obtained by converting the color image was sent, the number of sent monochrome image pages and the number of sent color image pages are output as a transmission result report after transmission. The user can easily confirm with reference to this report if a color document or color/monochrome mixed document was sent as he or she intended.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus comprising:
   an image processor, arranged to process color and monochrome images;
   a communication controller, arranged to control a communication with a partner apparatus; and
   a setter, arranged to set whether a color image is transmitted as a monochrome image or not when the partner apparatus does not have color reception performance; and
   a mode controller, arranged to control a switch between a memory transmission mode which starts transmission of an image after the image is stored in a memory, and a direct transmission mode which generates an image to be transmitted after the communication with the partner apparatus is started,
   wherein when transmission of a color image is instructed, the mode controller selects the memory transmission mode if the transmission of the color image as a monochrome image is inhibited by the setter, or the direct transmission mode if the transmission of the color image as a monochrome image is permitted by the setter.

2. The apparatus according to claim 1, wherein when the partner apparatus does not have the color reception performance, and the setter inhibits the transmission of the color image as a monochrome image, the mode controller cancels the transmission of an image, and outputs a message that prompts to transmit a monochrome image to the partner apparatus.

3. The apparatus according to claim 1, wherein when the partner apparatus does not have the color reception performance, and the setter permits the transmission of the color image as a monochrome image, the mode controller outputs a message that indicates a monochrome image has been transmitted instead of the color image.

4. The apparatus according to claim 1, wherein when the setter inhibits the transmission of a color image as a monochrome image, the mode controller accepts a simulcast instruction, and when the setter permits that, the mode controller does not accept a simulcast instruction.

5. The apparatus according to claim 1, wherein the mode controller outputs the number of pages transmitted as color images and the number of pages transmitted as monochrome images.

6. A control method of controlling a communication apparatus having an image processor which processes color and monochrome images, and a communication controller which controls a communication with a partner apparatus, comprising the step of:

setting whether a color image is transmitted as a monochrome or not when the partner apparatus does not have color reception performance; and controlling a switch between a memory transmission mode which starts transmission of an image after the image is stored in a memory, and a direct transmission mode which generates an image to be transmitted after the communication with the partner apparatus is started, wherein when transmission of a color image is instructed, the controlling step selects the memory transmission mode if the transmission of the color image as a monochrome image is inhibited in the setting step, or the direct transmission mode if the transmission of the color image as a monochrome image is permitted in the setting step.

7. The method according to claim 6, further comprising the step of canceling the transmission of an image, and outputting a message that prompts to transmit a monochrome image to the partner apparatus, when the partner apparatus does not have the color reception performance, and the transmission of the color image as a monochrome image is inhibited in the setting step.

8. The method according to claim 6, further comprising the step of outputting a message that indicates a monochrome image has been transmitted instead of the color image, when the partner apparatus does not have the color reception performance, and the transmission of the color image as a monochrome image is permitted in the setting step.

9. The method according to claim 6, further comprising the step of accepting a simulcast instruction, wherein the simulcast instruction is acceptable when the transmission of a color image as a monochrome image is inhibited in the setting step, and the simulcast instruction is unacceptable when that is permitted in the setting step.

10. The apparatus according to claim 6, further comprising the step of outputting the number of pages transmitted as color images and the number of pages transmitted as monochrome images.

11. A computer program stored on a computer readable medium for a control method of controlling a communication apparatus having an image processor which processes color and monochrome images, and a communication controller which controls a communication with a partner apparatus, the method comprising the steps of:

setting whether a color image is transmitted as a monochrome image or not when the partner apparatus does not have color reception performance; and controlling a switch between a memory transmission mode which starts transmission of an image after the image is stored in a memory, and a direct transmission mode which generates an image to be transmitted after the communication with the partner apparatus is started, wherein when transmission of a color image is instructed, the controlling step selects the memory transmission mode if the transmission of the color image as a monochrome image is inhibited in the setting step, or the direct transmission mode if the transmission of the color image as a monochrome image is permitted in the setting step.

12. A computer program product stored on a computer readable medium comprising computer program code, for a control method of controlling a communication apparatus having an image processor which processes color and monochrome images, and a communication controller which controls a communication with a partner apparatus, the method comprising the steps of:

setting whether a color image is transmitted as a monochrome image or not when the partner apparatus does not have color reception performance; and controlling a switch between a memory transmission mode which starts transmission of an image after the image is stored in a memory, and a direct transmission mode which generates an image to be transmitted after the communication with the partner apparatus is started, wherein when transmission of a color image is instructed, the controlling step selects the memory transmission mode if the transmission of the color image as a monochrome image is inhibited in the setting step, or the direct transmission mode if the transmission of the color image as a monochrome image is permitted in the setting step.

* * * * *

UNITED STATES PATENT AND TRADEMARK OFFICE
CERTIFICATE OF CORRECTION

PATENT NO. : 6,985,255 B2  Page 1 of 1
APPLICATION NO. : 09/867472
DATED : January 10, 2006
INVENTOR(S) : Toshiaki Saito It is certified that error appears in the above-identified patent and that said Letters Patent is hereby corrected as shown below:

ON TITLE PAGE AT (30) FOREIGN APPLICATION PRIORITY DATA

"Jun. 5, 2000 (JP) ………. 2001-168127" should read-- Jun. 5, 2000 (JP) ………. 2000-168127--.

ON TITLE PAGE AT (56) FOREIGN PATENT DOCUMENTS

"09069953" should read -- 09-069953--.

COLUMN 6

Line 2, "(APPLi-" should read --(Appli---; and
Line 4, "(COMment" should read --(Comment--.

COLUMN 10

Line 33, "and" should be deleted.

COLUMN 11

Line 11, "step" should read --steps--.

Signed and Sealed this

Twenty-eighth Day of November, 2006

JON W. DUDAS
*Director of the United States Patent and Trademark Office*